US008752966B2

(12) United States Patent
Nishi et al.

(10) Patent No.: US 8,752,966 B2
(45) Date of Patent: Jun. 17, 2014

(54) LIGHT SOURCE DEVICE AND PROJECTOR

(75) Inventors: Toshizo Nishi, Matsumoto (JP); Akira Momose, Shiojiri (JP); Ryo Okamura, Matsumoto (JP); Takahiro Takizawa, Suzaka (JP)

(73) Assignee: Seiko Epson Corporation, Tokyo (JP)

( * ) Notice: Subject to any disclaimer, the term of this patent is extended or adjusted under 35 U.S.C. 154(b) by 324 days.

(21) Appl. No.: 13/245,108

(22) Filed: Sep. 26, 2011

(65) Prior Publication Data
US 2012/0075864 A1    Mar. 29, 2012

(30) Foreign Application Priority Data

Sep. 27, 2010   (JP) .................................. 2010-215666

(51) Int. Cl.
G03B 21/16    (2006.01)
(52) U.S. Cl.
USPC .................. 353/52; 353/54; 353/58; 353/61; 313/32; 313/36; 313/25
(58) Field of Classification Search
USPC .............. 353/52–61; 362/264, 294, 345, 373; 348/743–747, E5.141, E5.143; 313/25, 313/32, 36
See application file for complete search history.

(56) References Cited

U.S. PATENT DOCUMENTS

| 5,860,719 A * | 1/1999 | Suzuki et al. ................... 353/61 |
| 6,580,200 B2 * | 6/2003 | Fukuyo et al. ................... 313/25 |
| 2005/0001989 A1 * | 1/2005 | Fujimori et al. ................ 353/57 |
| 2010/0045940 A1 * | 2/2010 | Takagi ............................ 353/54 |
| 2010/0231867 A1 | 9/2010 | Takezawa |
| 2011/0234987 A1 | 9/2011 | Tanaka et al. |

FOREIGN PATENT DOCUMENTS

| JP | 2008-216727 A | 9/2008 |
| JP | 2010-212115 A | 9/2010 |

* cited by examiner

*Primary Examiner* — Sultan Chowdhury
(74) *Attorney, Agent, or Firm* — ALG Intellectual Property, LLC

(57) ABSTRACT

A light source device includes a light emitting tube having a light emitting section configured to emit light, a first reflecting member configured to reflect the light emitted from the light emitting section, and a rectifying member disposed between the light emitting section and the first reflecting member, and configured to rectify a cooling fluid configured to cool the light emitting tube, and the rectifying member includes a rectifying surface configured to guide the cooling fluid flowing toward the rectifying member to the light emitting section, and a pair of standing surfaces standing from both ends of the rectifying surface.

12 Claims, 12 Drawing Sheets

LIGHT SOURCE DEVICE AND PROJECTOR

CROSS-REFERENCE

The entire disclosure of Japanese Patent Application No. 2010-215666 filed Sep. 27, 2010 is expressly incorporated by reference herein.

BACKGROUND

1. Technical Field

The present invention relates to a light source device and a projector.

2. Related Art

In the past, there has been known a projector provided with a light source device, a light modulation device for modulating a light beam emitted from the light source device to thereby form image light, and a projection optical device for projecting the image light on a target projection surface such as a screen in an enlarged manner. Among these constituents, as the light source device, a configuration provided with a discharge light emitting tube such as a super high-pressure mercury lamp, and a reflecting member (a reflector) for reflecting the incident light from the light emitting tube has been widely adopted.

The discharge light emitting tube has a light emitting section having a roughly spherical shape, and a pair of sealing sections extending from the both ends of the light emitting section in the directions opposite to each other, and in the discharge space inside the light emitting section there are encapsulated a pair of electrodes and a light emitting material such as mercury. When lighting such a light emitting tube, an upper part of the light emitting section becomes an area with the highest temperature, and a lower part thereof becomes an area with the lowest temperature. If the high temperature state of the upper part of such a light emitting section continues, devitrification becomes apt to occur on the one hand, if the difference in temperature between the upper part and the lower part becomes large, blackening becomes apt to occur on the other hand, and thus, the light emitting tube becomes apt to be deteriorated.

Regarding such a problem, there has been known a light source device provided with a rectifying device disposed between the light emitting section and the reflecting member and for flowing the cooling air, which flows along the inner surface of the reflecting member, toward the light emitting section (see, e.g., JP-A-2008-216727 (Document 1)).

The rectifying device described in Document 1 is provided with a pair of rectifying plates for changing the direction of the cooling air, and guides the cooling air flowing along the inner surface of the reflecting member so as to be spooled in the upper side of the light emitting section with one of the pair of rectifying plates.

However, in the rectifying device described in Document 1 mentioned above, there is a problem that some of the cooling air reaching the rectifying device flows laterally along the rectifying plate, and fails to be guided to the light emitting section. Therefore, there has been demanded a configuration capable of more efficiently cooling the light emitting section (in particular the upper part of the light emitting section).

SUMMARY

An advantage of some aspects of the invention is to provide a light source device and a projector capable of efficiently cooling the light emitting section.

An aspect of the invention is directed to a light source device including a light emitting tube having a light emitting section configured to emit light, a first reflecting member configured to reflect the light emitted from the light emitting section, and a rectifying member disposed between the light emitting section and the first reflecting member, and configured to rectify a cooling fluid configured to cool the light emitting tube, wherein the rectifying member includes a rectifying surface configured to guide the cooling fluid flowing toward the rectifying member to the light emitting section, and a pair of standing surfaces standing from both ends of the rectifying surface.

According to this aspect of the invention, it is possible to guide the cooling fluid flowing toward the rectifying surface of the rectifying member to the light emitting section using the rectifying surface. Besides the above, it is possible to guide the cooling fluid flowing toward the standing surfaces to the light emitting section directly or via the rectifying surface using the pair of standing surfaces. According to this configuration, the cooling fluid flowing toward the rectifying member can be prevented from flowing along the rectifying member and failing to flow to the light emitting section, and the flow volume of the cooling fluid flowing to the light emitting section can be increased. Therefore, the light emitting section can efficiently be cooled.

In the light source device according to the above aspect of the invention, it is preferable that an angle formed between the standing surfaces is from 60° to 180° or smaller. Further, the angle formed is preferably from 90° to 150°, and is most preferably 120°.

Here, if the angle formed is smaller than 60°, the area of the rectifying surface becomes small, and the cooling fluid guided toward the light emitting section decreases, and therefore, the cooling efficiency of the light emitting section is not so high. On the other hand, if the angle formed exceeds 180°, the flow regulation of the cooling fluid by the pair of standing surfaces is not performed effectively, and the flow volume of the cooling fluid guided toward the light emitting section is lowered, and the cooling efficiency of the light emitting section is degraded.

In contrast thereto, by setting the angle formed from 60° to 180°, the sufficient area of the rectifying surface can be assured, and at the same time, the flow regulation of the cooling fluid by the pair of standing surfaces can effectively be performed, and therefore, the cooling fluid can reliably be guided to the light emitting section. Further, by setting the angle formed to from 90° to 150°, the flow volume of the cooling fluid guided to the light emitting section can further be increased, and the light emitting section can more efficiently be cooled. Further, if the angle formed is 120°, it is possible to flow the cooling fluid toward the light emitting section most effectively, and the light emitting section can further more efficiently be cooled.

In the light source device according to the above aspect of the invention, it is preferable that a second reflecting member covering the light emitting section and configured to reflect the incident light from the light emitting section is further provided, the light emitting tube includes a first sealing section and a second sealing section extending from both ends of the light emitting section in respective directions departing from each other, the first reflecting member is disposed on a side of the first sealing section, and the second reflecting member covers the light emitting section on a side of the second sealing section with a predetermined distance.

Here, if the second reflecting member is disposed on the second sealing section side, it is difficult for the cooling fluid to flow to the position (in particular the upper part of the light emitting section) of the light emitting section covered by the second reflecting member.

In contrast thereto, according to the configuration described above, due to the rectifying member located on the first sealing section side opposite to the second sealing section, it is possible to flow the cooling fluid from the first sealing section side toward the light emitting section. According to this configuration, it is possible to make it easy to flow the cooling fluid to the gap between the second reflecting member and the light emitting section covered by the second reflecting member. Therefore, the light emitting section can more efficiently be cooled.

In the light source device according to the above aspect of the invention, it is preferable that the first reflecting member has an opening section in which the first sealing section is inserted, and the rectifying member is formed to have a tubular shape configured to occlude the opening section.

Here, the inside diameter of the opening section is required to form larger than the outside diameter of the first sealing section, if the first sealing section is inserted in the opening section, a gap is formed between the inner end surface of the opening section and the first sealing section.

In contrast thereto, according to the configuration described above, since the rectifying member is formed to have a tubular shape occluding the opening section, it is possible to flow the cooling fluid toward the light emitting section without flowing the cooling fluid into the gap. Therefore, the light emitting section can further more efficiently be cooled.

In the light source device according to the above aspect of the invention, it is preferable that the rectifying member is attached to the first reflecting member.

Here, in the case in which the first reflecting member has a reflecting surface shaped like a roughly concave curve, it is required to dispose the light emitting section at an appropriate position with respect to the first reflecting member in order for efficiently reflecting the light emitted from the light emitting tube using the first reflecting member. On this occasion, in the case in which the rectifying member described above is attached to the light emitting tube, if the gap between the rectifying member and the first reflecting member is narrow, there is a possibility that the rectifying member has contact with the first reflecting member when positioning the light emitting tube and the positioning cannot appropriately be performed. On the other hand, if the gap between the rectifying member and the first reflecting member is large, there is a possibility that the cooling fluid flows into the gap, and the rectification of the cooling fluid by the rectifying member cannot appropriately be performed.

In contrast thereto, according to the configuration described above, since the rectifying member is attached to the first reflecting member, it is possible to reliably flow the cooling fluid flowing into the rectifying member toward the light emitting section, and in addition, the positioning between the first reflecting member and the light emitting tube can appropriately be performed.

In the light source device according to the above aspect of the invention, it is preferable that there is further provided a housing body configured to house the light emitting tube, the first reflecting member, and the rectifying member inside, the housing body has a plurality of vents each configured to flow the cooling fluid, which is introduced externally, inside the housing body, and the plurality of vents are formed at respective positions where the vents makes the cooling fluids passing through the vents collide with each other at a collision position above the light emitting section.

According to this configuration, the cooling fluids delivered from the respective vents collide with each other at the collision position above the light emitting section to thereby cause a colliding jet including a turbulent flow and a swirling flow discretely diffused from the collision position. According to this configuration, by sending the colliding jet to the light emitting section, the heat transfer between the light emitting section (in particular the upper part of the light emitting section apt to be high-temperature when lighting) and the cooling fluid can be improved compared to the case of directly delivering the cooling fluid toward the light emitting section. Therefore, the cooling efficiency of the light emitting tube can be improved, and as a result, the improvement in the lighting stability of the light emitting tube and the longer operating life can be achieved.

Here, in order for making the cooling fluids collide with each other at the collision position described above and then flowing the colliding jet thus generated appropriately to the light emitting section, it is required to appropriately set the delivery direction and the flow volume of the cooling fluid from each of the vents, and such adjustment is difficult.

In contrast thereto, according to the configuration described above, since the rectifying member is disposed between the first reflecting member and the light emitting section, it is possible for the rectifying member to flow the colliding jet thus generated more effectively toward the light emitting section. Therefore, the adjustment of the delivery direction and the flow volume of the cooling fluid can be simplified.

Another aspect of the invention is directed to a projector including the light source device described above, a light modulation device configured to modulate the light emitted from the light source device, and a projection optical device configured to project the light modulated.

According to this aspect of the invention, substantially the same advantages as in the light source device described above can be obtained. Further, since it is possible to efficiently cool the light emitting section, the longer operating life of the light emitting tube can be achieved, and therefore, the replacement cycle of the light source device can be elongated, and the trouble of the maintenance of the projector can be saved.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
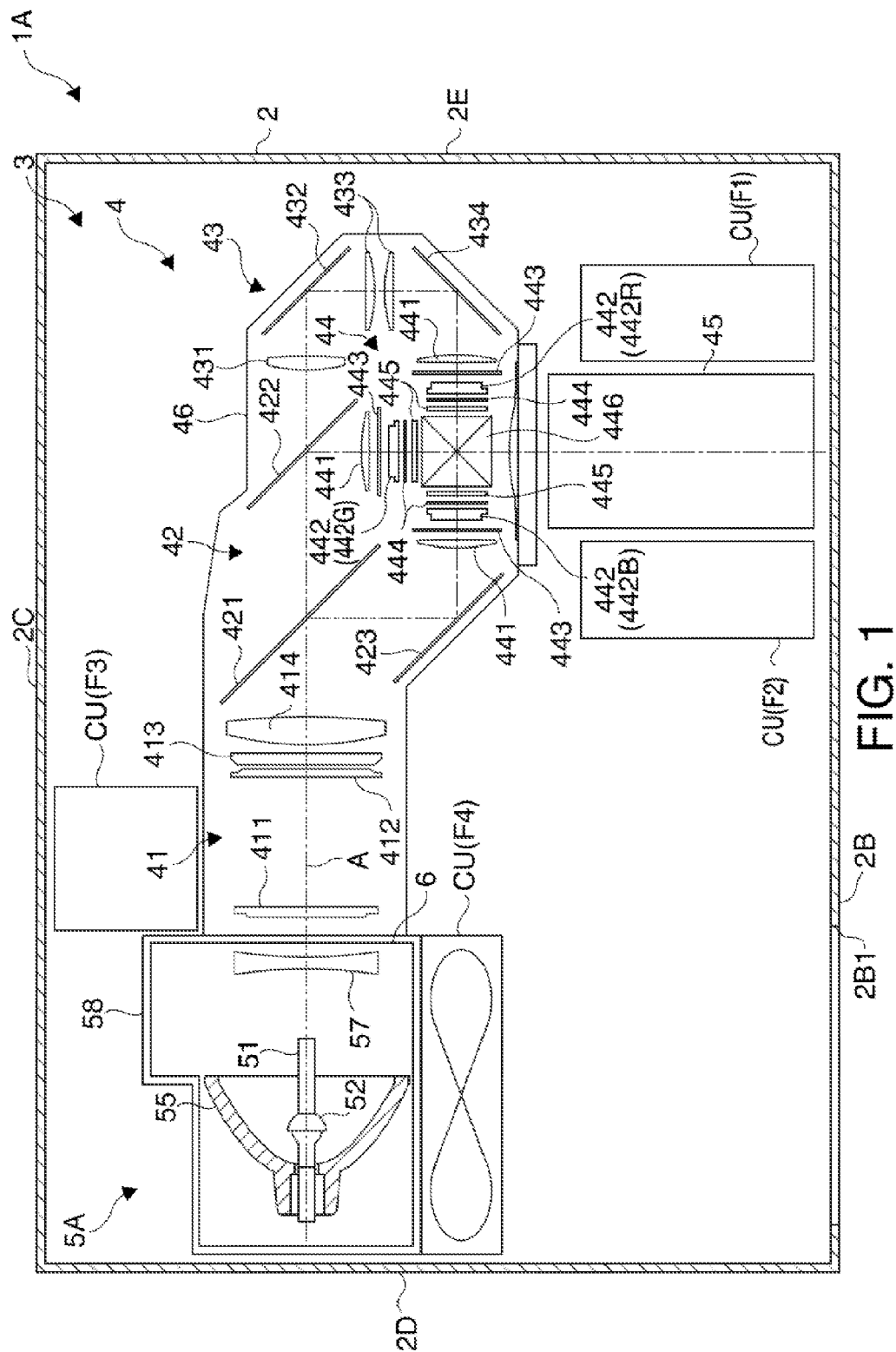
FIG. 1 is a schematic diagram showing a configuration of a projector according to a first embodiment of the invention.

A first embodiment of the invention will hereinafter be explained with reference to the accompanying drawings.
Configuration of Projector FIG. 1 is a schematic diagram showing a configuration of a projector 1A according to the present embodiment.

The projector 1A according to the present embodiment is for modulating a light beam emitted from a light source disposed inside to thereby form image light, and then projecting the image light on the target projection surface such as a screen in an enlarged manner. As shown in FIG. 1, the projector 1A is provided with an exterior housing 2 forming an exterior, and a device main body 3 disposed and housed inside the exterior housing 2.

The exterior housing 2 is formed to have a roughly rectangular solid whole shape having a top face (not shown), a front face 2B, a rear face 2C, a left side face 2D, a right side face 2E, and a bottom face (not shown), and the bottom face is provided with a plurality of legs (not shown). Further, the projector 1A takes a normal setting posture when being disposed so that the legs have contact with a mounting surface of, for example, a table, and takes a ceiling mount posture when being attached in a state of turning the normal setting posture upside down to thereby direct the bottom face to the ceiling or the like.

In addition to a cooling device CU and an optical unit 4, the device main body 3 is provided with a power supply device for supplying each of the constituents of the projector 1A with electrical power, a control device for controlling an operation of each of the constituents of the projector 1A, and so on although not shown in the drawings.

The cooling device CU is composed of a plurality of fans F1 through F4, introduces the cooling air as a cooling fluid from the outside of the exterior housing 2, sends the cooling air to the optical unit 4, the power supply device, and the control device to thereby cool each of these devices.

Among these fans F1 through F4, the fan F3 located on the rear face 2C side of the projector 1A is formed of a sirocco fan, and sucks in the cooling air introduced in the exterior housing 2, and then sends it to a light source device 5A. Further, the fan F4 is formed of an axial fan, and sucks in the air having cooled the light source device 5A, and then discharges it to the outside of the exterior housing 2 via a discharge port 2B1 of the front face 2B. It should be noted that the fan F3 can also be an axial fan, and the fan F4 can also be a sirocco fan. Further, the discharge port 2B1 can also be provided to any one of the faces of the exterior housing 2.
Configuration of Optical Unit The optical unit 4 forms the image light corresponding to image information, and then projects the image light on to the target projection surface under the control of the control device described above. The optical unit 4 is provided with the light source device 5A, an illumination optical device 41, a color separation optical device 42, a relay optical device 43, an electro-optic device 44, a projection optical device 45, and an optical component housing 46 for housing and disposing each of the devices 5A, 41 through 44 at predetermined positions on an illumination light axis A set inside, and at the same time, supporting the projection optical device 45.

It should be noted that a configuration of the light source device 5A will be explained later in detail.

The illumination optical device 41 is provided with a pair of lens arrays 411, 412, a polarization conversion element 413, and an overlapping lens 414.

The color separation optical device 42 is provided with a dichroic mirrors 421, 422, and a reflecting mirror 423, and the relay optical device 43 is provided with an entrance side lens 431, a relay lens 433, and reflecting mirrors 432, 434.

The electro-optic device 44 is provided with a field lens 441, three liquid crystal panels 442 (the liquid crystal panels for red light, green light, and blue light are denoted with 442R, 442G, and 442B, respectively) as light modulation devices, three entrance side polarization plates 443, three view angle compensating plates 444, three exit side polarization plates 445, and a cross dichroic prism 446 as a color combining optical device.

The projection optical device 45 projects the light beam modulated by the electro-optic device 44 in an enlarged manner. Although not shown in the drawings, the projection optical device 45 is configured as a combination lens composed of a plurality of lenses housed inside a lens tube having a cylindrical shape.

Figure 2:
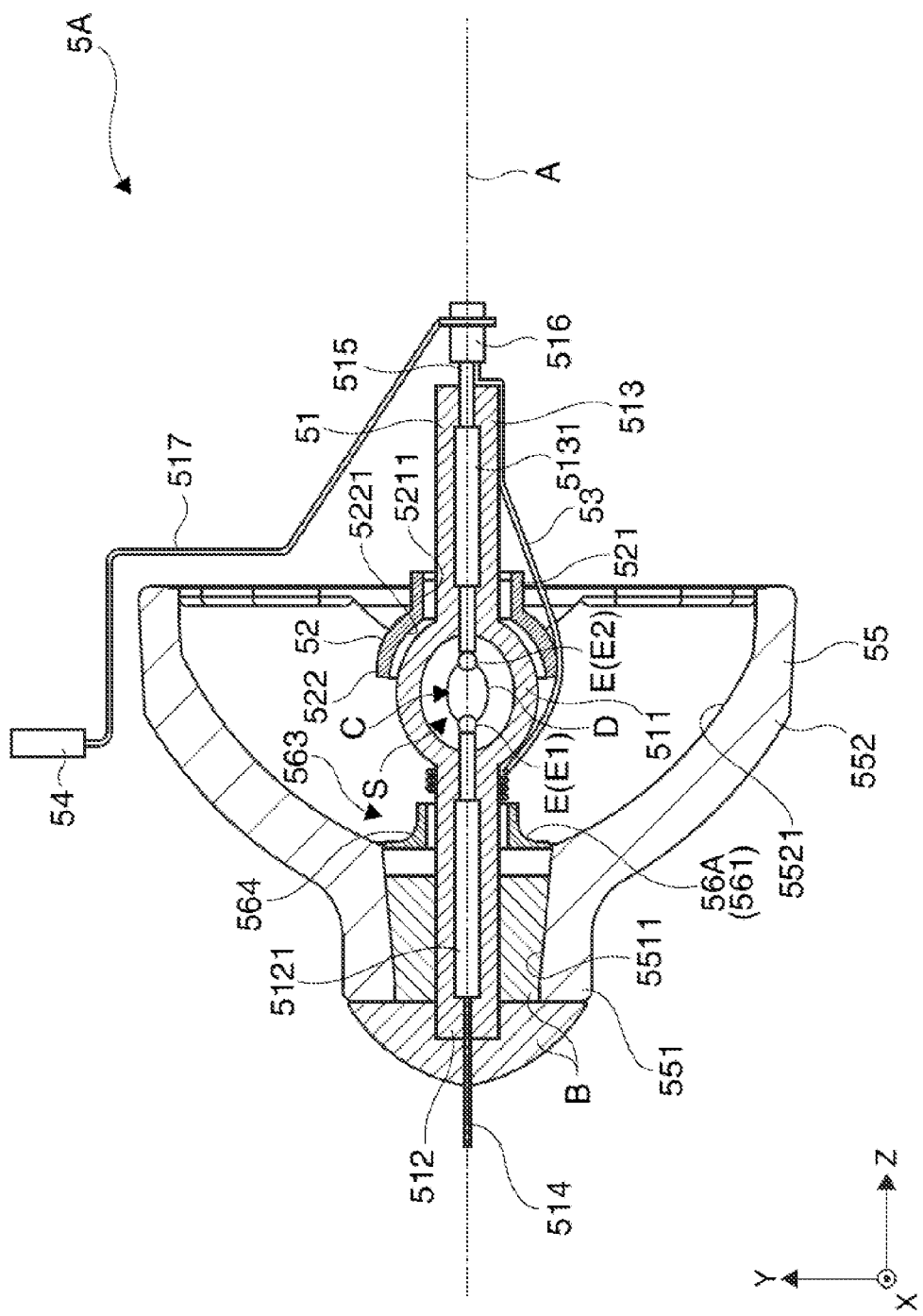
FIG. 2 is a cross-sectional view showing a configuration of a part of a light source device in the embodiment.

In such an optical unit 4, the illuminance of the light beam emitted from the light source device 5A is roughly equalized in the illumination area by the illumination optical device 41, and the light beam is separated into three colored lights of red (R), green (G), and blue (B) by the color separation optical device 42. These colored lights thus separated are respectively modulated by the liquid crystal panels 442 in accordance with the image information. Subsequently, the colored lights are combined by the cross dichroic prism 446, and then projected on to the projection surface by the projection optical device 45 in an enlarged manner.
Configuration of Light Source Device FIG. 2 is a cross-sectional view showing a configuration of a part of the light source device 5A. It should be noted that in the drawings and the explanation hereinafter described, the proceeding direction of the light beam emitted from the light source device 5A along a horizontal direction when setting the projector 1A in the normal setting posture is defined as a Z direction. Further, among the directions perpendicular to the Z direction, a direction along a horizontal direction and toward the left-hand direction viewed from the tip side of the Z direction is defined as an X direction, and an upward direction (an opposite direction to the plumb-bob direction) perpendicular to both of the Z direction and the X direction is defined as a Y direction. In other words, the directions respectively indicated by X, Y, and Z are perpendicular to each other. Therefore, FIG. 2 is a cross-sectional view of the light source device 5A along a Y-Z plane.

As shown in FIG. 2, the light source device 5A is provided with a light emitting tube 51 for emitting light, a secondary reflecting mirror 52, a trigger wire 53, a connection member 54, a primary reflecting mirror 55, a rectifying member 56A, a collimating concave lens 57 (FIG. 1), and a housing body 58 (FIG. 1) for housing these components.

Among these constituents, the trigger wire 53 is a starting booster wire for improving the starting performance in lighting the light emitting tube 51. Further, the connection member 54 connects a lead wire 517 extending from the light emitting tube 51 and the power supply device described above to each other. Further, the collimating concave lens 57 collimates the light beam converged by the primary reflecting mirror 55 described later with respect to the illumination light axis A.

Configuration of Light Emitting Tube

The light emitting tube 51 is a light source for emitting light in response to application of a voltage. The light emitting tube 51 has a light emitting section 511 bulging out to form a roughly spherical shape, and sealing sections 512, 513 extending from both ends of the light emitting section 511 toward the directions departing from each other. In such a light emitting tube 51, the diameter of the light emitting section 511 is set to approximately 10 mm, and the diameter of each of the sealing sections 512, 513 is set to approximately 5 mm.

In the inside of the light emitting section 511, there is formed a discharge space S in which a pair of electrodes E (the electrode on the base end side of the Z direction and the electrode on the tip side thereof are denoted with E1, E2, respectively) and a light-emitting material including mercury, noble gas, and a small amount of halogen are encapsulated.

The sealing section 512 on the base end side of the Z direction corresponds to a first sealing section according to the invention, and the sealing section 513 on the tip side of the Z direction corresponds to a second sealing section according to the invention. In the inside of each of the sealing sections 512, 513, there is inserted a metal foil 5121 (5131) made of molybdenum and electrically connected to the electrode E1 (E2), and an end of each of the sealing sections 512, 513 on the opposite side to the side of the light emitting section 511 is sealed with a glass material or the like. Lead wires 514, 515 are further connected respectively to the metal foils 5121, 5131, and the lead wires 514, 515 extend to the outside of the light emitting tube 51. When a voltage is applied to the lead wires 514, 515, an electrical potential difference occurs between the electrodes E1, E2 via the metal foils 5121, 5131 to cause discharge, and an arc image D is formed to thereby produce light inside the light emitting section 511. It should be noted that the lead wire 515 and the trigger wire 53 are connected to a lead wire 517 via a connection section 516.

As such a light emitting tube 51, various types of discharge light source lamps for emitting high-intensity light can be adopted, and specifically, a metal halide lamp, a high-pressure mercury lamp, a super high-pressure mercury lamp, and so on can be adopted.

Configuration of Secondary Reflecting Mirror

The secondary reflecting mirror 52 corresponds to a second reflecting member according to the invention.

The secondary reflecting mirror 52 is a molded object made of glass for covering the outer surface of the light emitting section 511 on the sealing section 513 side with a predetermined spacing, and is attached to the sealing section 513. The secondary reflecting mirror 52 has a neck-like section 521 having a roughly cylindrical shape and extending along the sealing section 513, and a reflecting section 522 extending from an end of the neck-like section 521 on the sealing section 512 side to form a concave curve.

The neck-like section 521 has an opening section 5211 through which the sealing section 513 is inserted.

The surface of the reflecting section 522 opposed to the light emitting section 511 is formed as a reflecting surface 5221 for reflecting the visible light toward the primary reflecting mirror 55, while transmitting the infrared ray and the ultraviolet ray.

Configuration of Primary Reflecting Mirror

The primary reflecting mirror 55 corresponds to a first reflecting member according to the invention.

The primary reflecting mirror 55 is an integrally molded object made of glass for reflecting the light entering from the light emitting section 511 and the reflecting surface 5221 to converge it at a second focal point on the illumination light axis A. The primary reflecting mirror 55 has a neck-like section 551 having a roughly cylindrical shape, and a reflecting section 552 extending from the neck-like section 551 to form a concave curve.

Among these constituents, a surface of the reflecting section 552 opposed to the light emitting section 511 and shaped like a rotation curve is provided with a reflecting surface 5521.

The neck-like section 551 has an opening section 5511 having a roughly circular shape, in which the sealing section 512 is inserted. In the condition in which the sealing section 512 is inserted through the opening section 5511, an adhesive B such as cement is injected between the inner end surface of the opening section 5511 and the sealing section 512, and thus, the sealing section 512 and the primary reflecting mirror 55 are fixed to each other. On this occasion, the relative position between the light emitting tube 51 and the primary reflecting mirror 55 is set so that the center position C of the arc image D generated by the discharge between the tips of the electrodes E is located in the vicinity of the first focal point of the reflecting surface 5521.

It should be noted that although the primary reflecting mirror 55 is formed of an ellipsoidal reflector having an ellipsoid of revolution in the present embodiment, it is also possible to form the primary reflecting mirror 55 using a paraboloidal reflector having a paraboloid of revolution. In this case, the configuration of eliminating the collimating concave lens 57 is adopted. Further, the primary reflecting mirror 55 can also be formed of a free-form reflector.

Configuration of Rectifying Member

Figure 3:
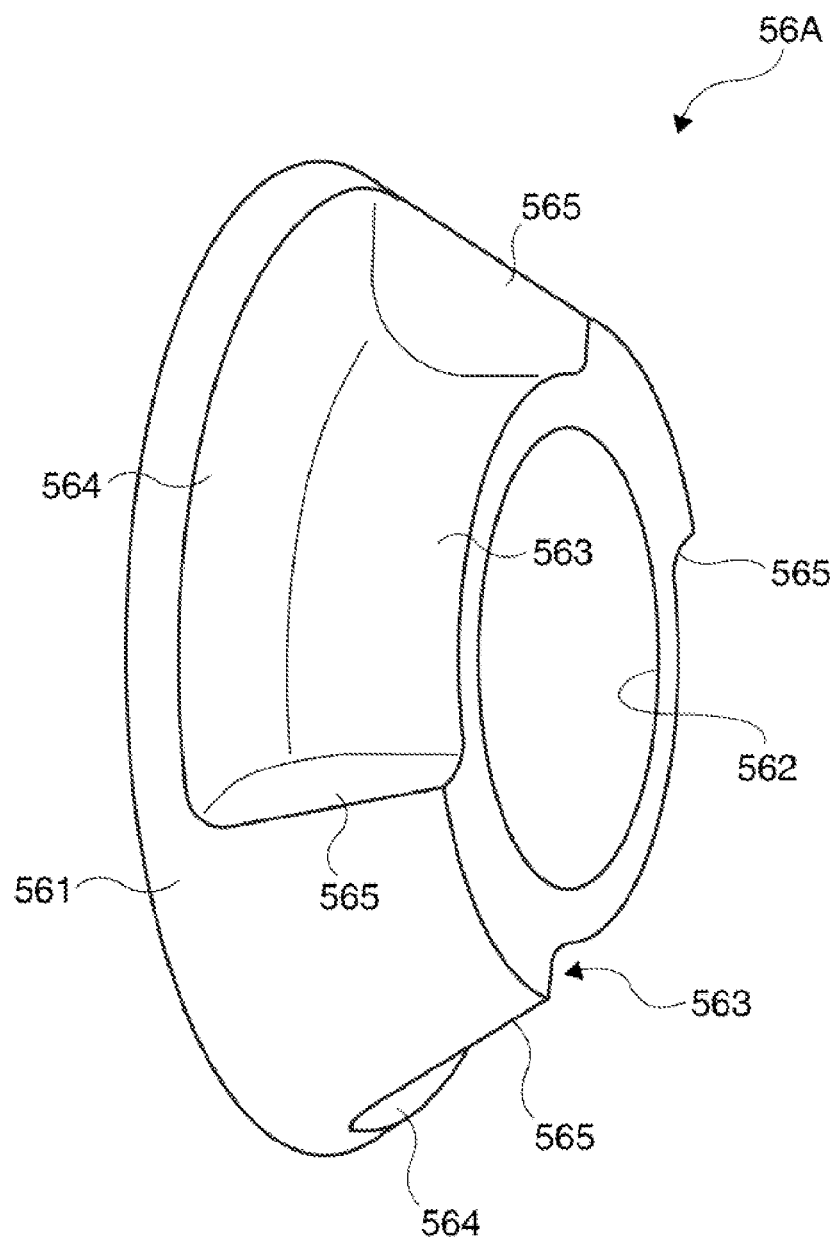
FIG. 3 is a perspective view showing a rectifying member in the embodiment.
Figure 4:
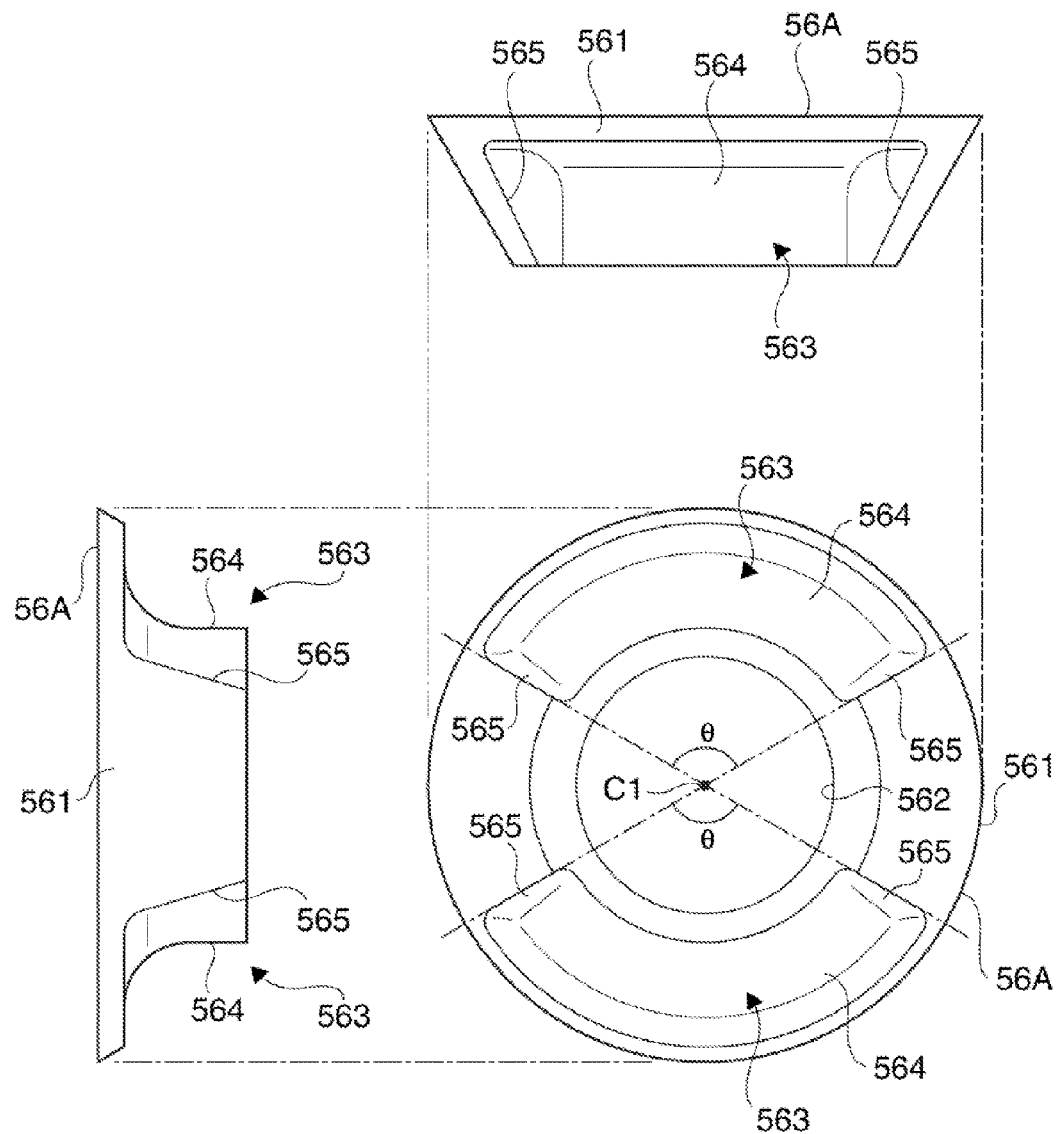
FIG. 4 is a set of orthographic views showing a rectifying member in the embodiment.

FIGS. 3 and 4 are a perspective view and orthographic views, respectively, showing a rectifying member 56A.

The rectifying member 56A has a function of adjusting the cooling air introduced inside from the outside of the housing body 58 and guiding it to the light emitting section 511. As shown in FIG. 2, the rectifying member 56A is fit into the opening section 5511 of the primary reflecting mirror 55, and is tentatively fixed so as to occlude the opening section 5511. Then, the rectifying member 56A is fixed to the primary reflecting mirror 55 after the positioning of the light emitting tube 51 with respect to the primary reflecting mirror 55. In other words, the rectifying member 56A is located between the light emitting section 511 and the primary reflecting mirror 55.

As shown in FIGS. 3 and 4, such a rectifying member 56A is provided with a main body section 561 having an opening section 562 and a pair of recesses 563.

The main body section 561 has a tubular shape forming a roughly circular truncated cone, and is formed so that the outside diameter of the end portion on the light emitting section 511 side becomes smaller than the outside diameter of the end portion on the primary reflecting mirror 55 side when the light emitting tube 51 is inserted in the opening section 562 of the rectifying member 56A. Such a main body section 561 has the opening section 562 having a roughly circular shape, which is formed along the center axis line of the main body section 561, and to which the sealing section 512 is inserted, and the pair of recesses 563.

Among these constituents, the inside diameter of the opening section 562 is larger than the outside diameter of the sealing section 512. Therefore, when the sealing section 512 is inserted through the opening section 562, a gap is formed between the inner end surface of the opening section 562 and the outer surface of the sealing section 512.

Further, as shown in FIG. 4, the pair of recesses 563 are formed symmetrically about the center C1 when viewing the rectifying member 56A along the axial direction of the main body section 561. The positions of these recesses 563 are located on the upper side and the lower side of the light emitting tube 51, respectively, when the projector 1A is installed with the normal setting posture and the ceiling mount posture.

Such recesses 563 each have a rectifying surface 564 as the bottom surface of the recess 563, and a pair of standing surfaces 565 standing from the both ends (the both ends in a circumferential direction) of the rectifying surface 564.

The rectifying surface 564 is a curved surface having a predetermined curvature, and has a function of guiding the cooling air, which has reached the rectifying surface 564, toward the light emitting section 511. In other words, although the details will be described later with reference to FIG. 5, the rectifying surface 564 changes the flow direction of the cooling air, which is introduced inside the housing body 58 via a vent 583 of the housing body 58 and flows along the reflecting surface 5521 of the primary reflecting mirror 55, toward the tip side of the Z direction (folds it toward the light emitting section 511) to thereby guide the cooling air to the light emitting section 511.

It should be noted that the rectifying member 56A is attached to the light emitting tube 51 so that the center of the rectifying surface 564 is located at the center of the flow of the cooling air delivered by the vent 583 described later.

The pair of standing surfaces 565 have a function of making the cooling air flowing along the main body section 561 out of the cooling air having flown toward the main body section 561 flow toward the light emitting section 511. As shown in the lower right diagram (the plan view) in FIG. 4, the pair of standing surfaces 565 are formed so that an angle (θ) formed between the standing surfaces 565 becomes 120°. It should be noted that although the details will be described later, the angle formed (hereinafter also referred to as a "spread angle") is preferably from 90° to 150°.

Configuration of Housing Body

Figure 5:
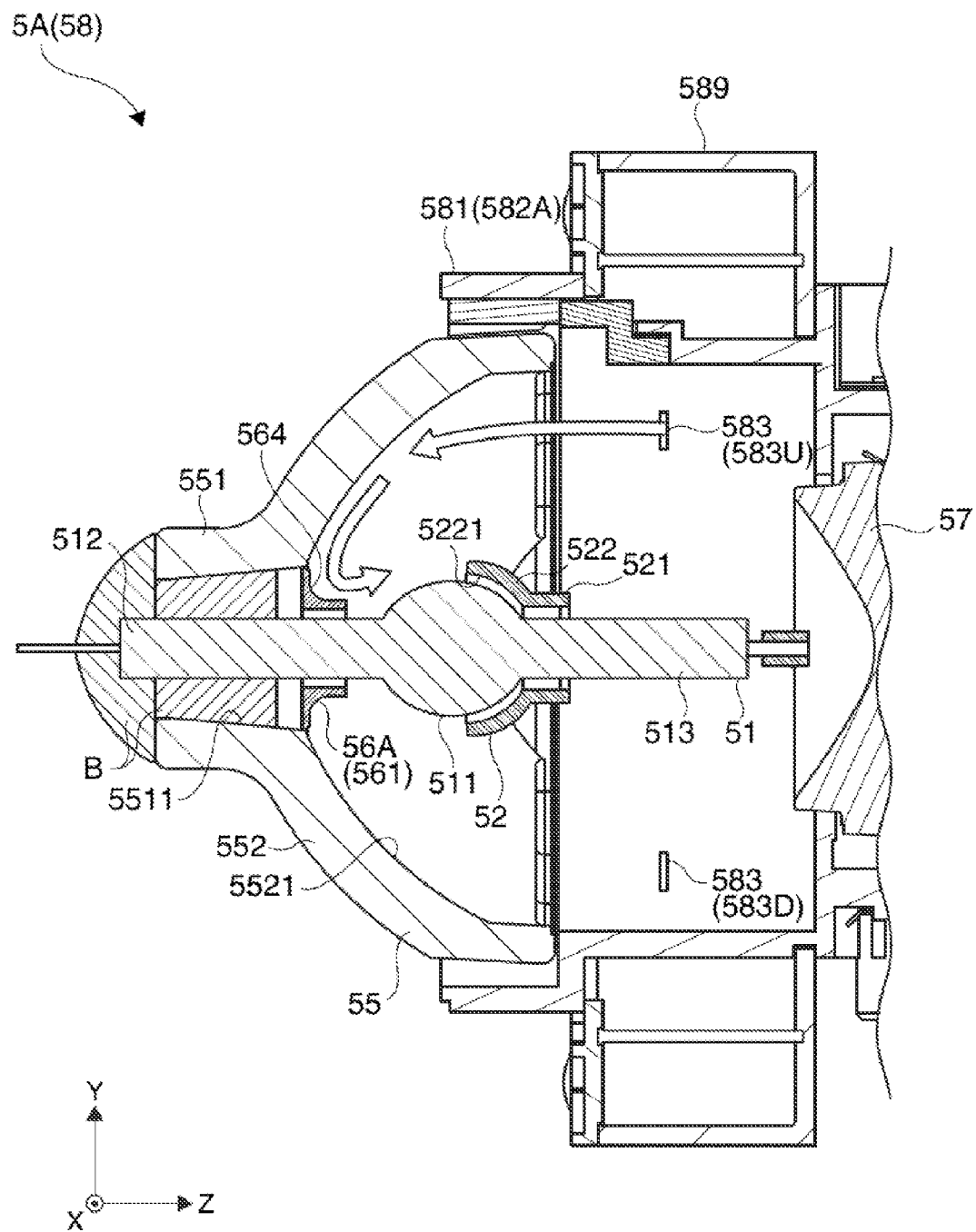
FIG. 5 is a schematic diagram showing a flowing direction of cooling air in the embodiment.

FIG. 5 is a schematic diagram showing a cross-section (a cross-section along the Y-Z plane) of the light source device 5A, and a schematic diagram showing the flow direction of the cooling air introduced inside a housing body main body 581. It should be noted that FIG. 5 shows the flow direction of the cooling air in the condition in which the projector 1A is installed with the normal setting posture.

As shown in FIG. 5, the housing body 58 is provided with the housing body main body 581 and a duct 589 attached to the housing body main body 581.

Among the constituents, the duct 589 guides the cooling air, which has been discharged from the fan F3, to a first main body section 582A constituting the housing body main body 581.

The housing body main body 581 is a box-like housing, which houses the light emitting tube 51, the primary reflecting mirror 55, and so on inside, and to which the collimating concave lens 57 is fixed, and is provided with the first main body section 582A for covering primary reflecting mirror 55 on the tip side of the Z direction, and a second main body section (not shown) for covering the base end side of the Z direction.

The first main body section 582A is located above and below the light emitting tube 51 when viewed from the tip side of the Z direction, and is provided with the vents 583 (583U, 583D) for delivering the cooling air.

Among these ports, the vent 583U is located above the light emitting tube 51 when setting the projector 1A in the normal setting posture, and the vent 583D is located above the light emitting tube 51 when setting the projector 1A in the ceiling mount posture. Further, the vent 583 located on the upper side in accordance with the posture of the projector 1A delivers the cooling air, which has been introduced from the outside of the housing body 58 via the duct 589, toward the upper side of the light emitting section 511.

Flow Direction of Cooling Air

Then, the flow channel of the cooling air for cooling the light emitting tube 51 will be explained.

In the case in which the projector 1A is in the normal setting posture, the cooling air discharged from the fan F3 flows through the duct 589 and is guided to the vent 583U located above the light emitting tube 51. As shown in FIG. 5, the cooling air is delivered from the vent 583U toward the rectifying member 56A. On this occasion, the cooling air flows along the reflecting surface 5521.

The flow direction of the cooling air having reached the rectifying member 56A is directed by the rectifying member 564 toward the tip side of the Z direction. On the other hand, the cooling air is prevented by the pair of standing surfaces 565 standing from the both ends of the rectifying surface 564 from branching laterally on the rectifying surface 564 to flow to the lower side of the light emitting tube 51, and at the same time, the flow direction of such cooling air is also changed toward the tip side of the Z direction.

The cooling air flowing toward the tip side of the Z direction flows along the light emitting section 511 to thereby cool the upper part of the light emitting section 511, and further flows toward the sealing section 513 to thereby cool the sealing section 513. On this occasion, some of the cooling air flows into the gap between the light emitting section 511 and the reflecting section 522 of the secondary reflecting mirror 52 to thereby cool the upper part of the light emitting section 511.

Although the flow direction of the cooling air in the case in which the projector 1A is installed in the normal setting posture is hereinabove explained, the same can be applied to the case of installing it in the ceiling mount posture.

Range of Spread Angle

Figure 6:
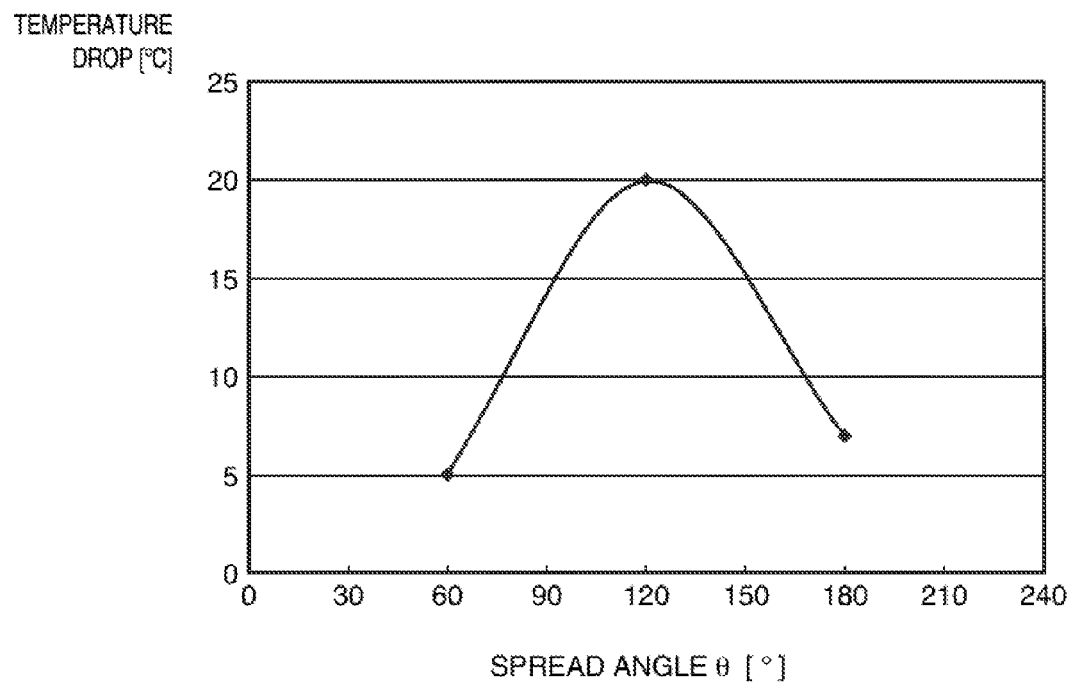
FIG. 6 is a diagram showing a relationship between a spread angle between a pair of standing surfaces and temperature drop of an upper part of a light emitting section in the embodiment.

FIG. 6 is a diagram showing a relationship between the spread angle between the pair of standing surfaces 565 and temperature drop of the upper part of the light emitting section 511.

As described above, due to the pair of standing surfaces 565 standing from the both ends of the rectifying surface 564, the flow volume of the cooling air, which is folded toward the light emitting section 511, and flows toward the light emitting section 511, can be increased. Although the spread angle (θ) between the standing surfaces 565 is set to 120° as described above, the spread angle is not limited thereto.

As shown in FIG. 6, if the spread angle (θ) is from 60° to 180°, the temperature drop of the light emitting section 511 is observed. In particular, in the case in which the spread angle (θ) is in from 90° to 150°, the temperature drop of the light emitting section 511 becomes as remarkable as 15° C. or larger. Further, in the most preferable case, the spread angle (θ) between the pair of standing surfaces 565 is 120°. In this case, in the upper part of the light emitting section 511 of about 10 mm, the temperature drop of about 20° C. can be obtained when lighting.

According to the projector 1A of the present embodiment explained hereinabove, the following advantages can be obtained.

It is possible to guide the cooling air delivered from the vent 583 of the housing body 58 to the light emitting section 511 by folding the cooling air using the rectifying surface 564 of the rectifying member 56A. Besides the above, it is possible to guide the cooling fluid flowing toward the standing surfaces 565 to the light emitting section 511 directly or via the rectifying surface 564 using the pair of standing surfaces 565. According to this configuration, since the cooling air flowing toward the rectifying member 56A can be prevented from flowing downward along the rectifying member 56A, the flow volume of the cooling air flowing to the light emitting section 511 can be increased.

Therefore, since it is possible to efficiently cool the upper part of the light emitting section 511 to thereby reduce the temperature difference between the upper part and the lower part in the light emitting section 511, improvement in lighting stability and longer operating life of the light emitting tube 51 can be achieved.

Since the angle (θ) formed between the pair of standing surfaces 565 is 120°, it is possible to surely provide the area of the rectifying surface 564 sufficient for folding the cooling air having reached the rectifying member 56A toward the light emitting section 511, and at the same time, to most effectively perform the flow regulation of the cooling air by the pair of standing surfaces 565. Therefore, it is possible to surely guide the cooling air to the light emitting section 511 to thereby surely achieve the temperature drop of the light emitting section 511.

It should be noted that, as described above, even if the angle (θ) thus formed is from 60° to 180° (more preferably, from 90° to 150°), it is possible to guide the cooling air to the light emitting section 511, and thus the light emitting section 511 can efficiently be cooled although the efficiency is degraded compared to the case in which the angle is 120°.

If the secondary reflecting mirror 52 for covering the light emitting section 511 on the sealing section 513 side is provided, the cooling efficiency of the light emitting section 511 is degraded although the light efficiency is improved when forming the image.

In contrast, since the rectifying member 56A is disposed on the sealing section 512 side opposite to the sealing section 513, it is possible to make it easy to flow the cooling air through the gap between the secondary reflecting mirror 52 and the light emitting section 511 covered by the secondary reflecting mirror 52. Therefore, the light emitting section 511 can more efficiently be cooled.

Since the rectifying member 56A is formed to have a tubular shape occluding the opening section 5511 of the primary reflecting mirror 55, it is possible to prevent the gap from being formed between the opening section 5511 and the rectifying member 56A, and thus, it is possible to prevent the cooling air delivered from the vent 583 from flowing into the opening section 5511. According to this configuration, it is possible to surely increase the flow volume of the cooling air flowing toward the light emitting section 511. Therefore, the light emitting section 511 can much more efficiently be cooled.

Further, since the rectifying member 56A is attached to the opening section 5511 so as to occlude the opening section 5511, the positioning of the light emitting tube 51 can be simplified compared to the case in which the rectifying member 56A is attached to the light emitting tube 51.

Second Embodiment

Hereinafter, a second embodiment of the invention will be explained.

A projector according to the present embodiment has a similar configuration as the projector 1A. Although the cooling air is delivered from either one of the vents 583, located above the light emitting tube 51 in the projector 1A, in the projector according to the present embodiment, the cooling air respectively delivered from the two vents located above the light emitting tube 51 is made to collide with each other above the light emitting section 511 to generate a colliding jet (including a swirling flow and a turbulent flow), and the light emitting tube 51 is cooled by the colliding jet thus generated. The projector according to the present embodiment and the projector 1A are different from each other in this point.

It should be noted that in the explanation below, the part the same or substantially the same as the part having already been explained is denoted with the same reference symbol, and the explanation therefor will be omitted.

Figure 7:
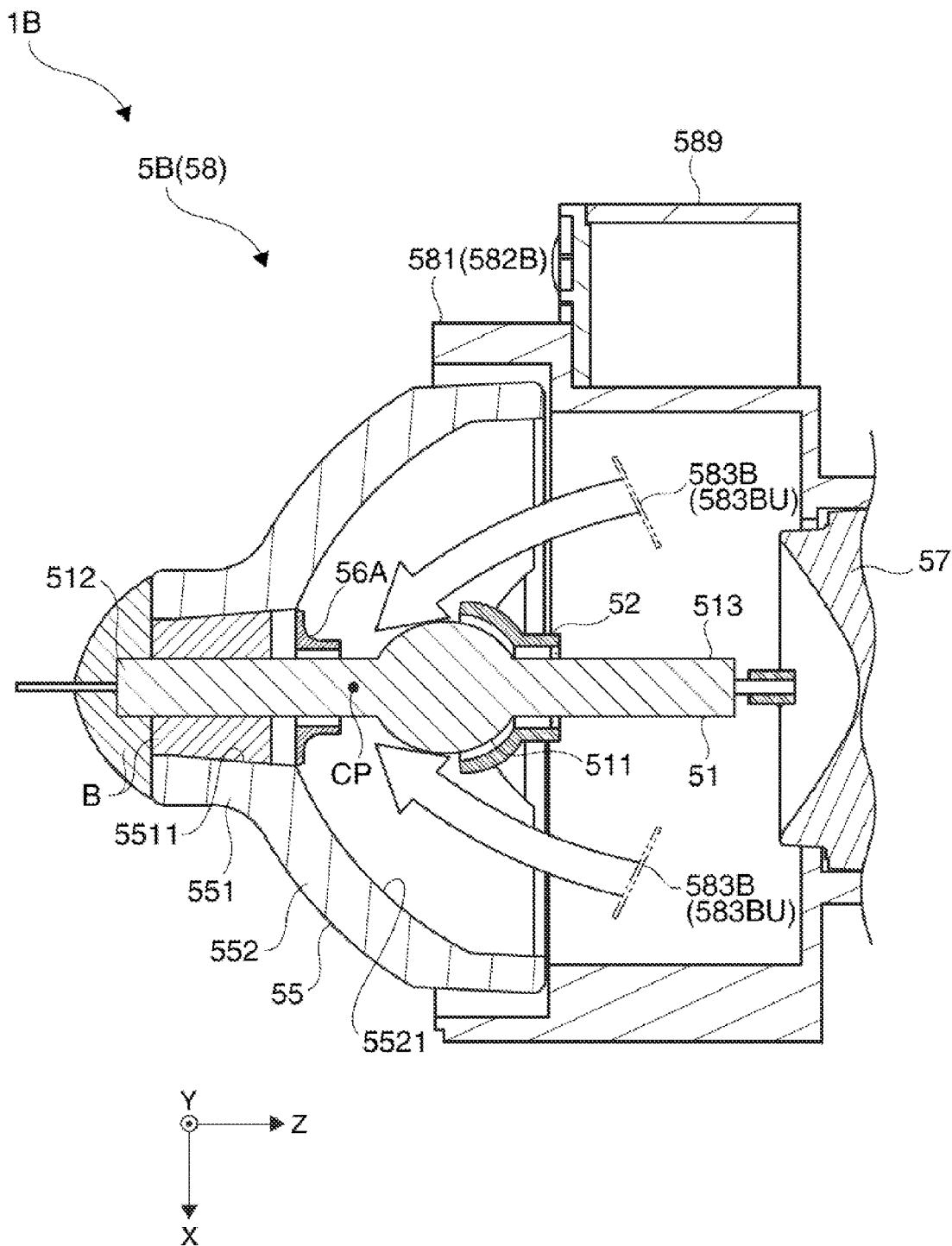
FIG. 7 is a lateral cross-sectional view showing a light source device of a projector according to a second embodiment of the invention.
Figure 8:
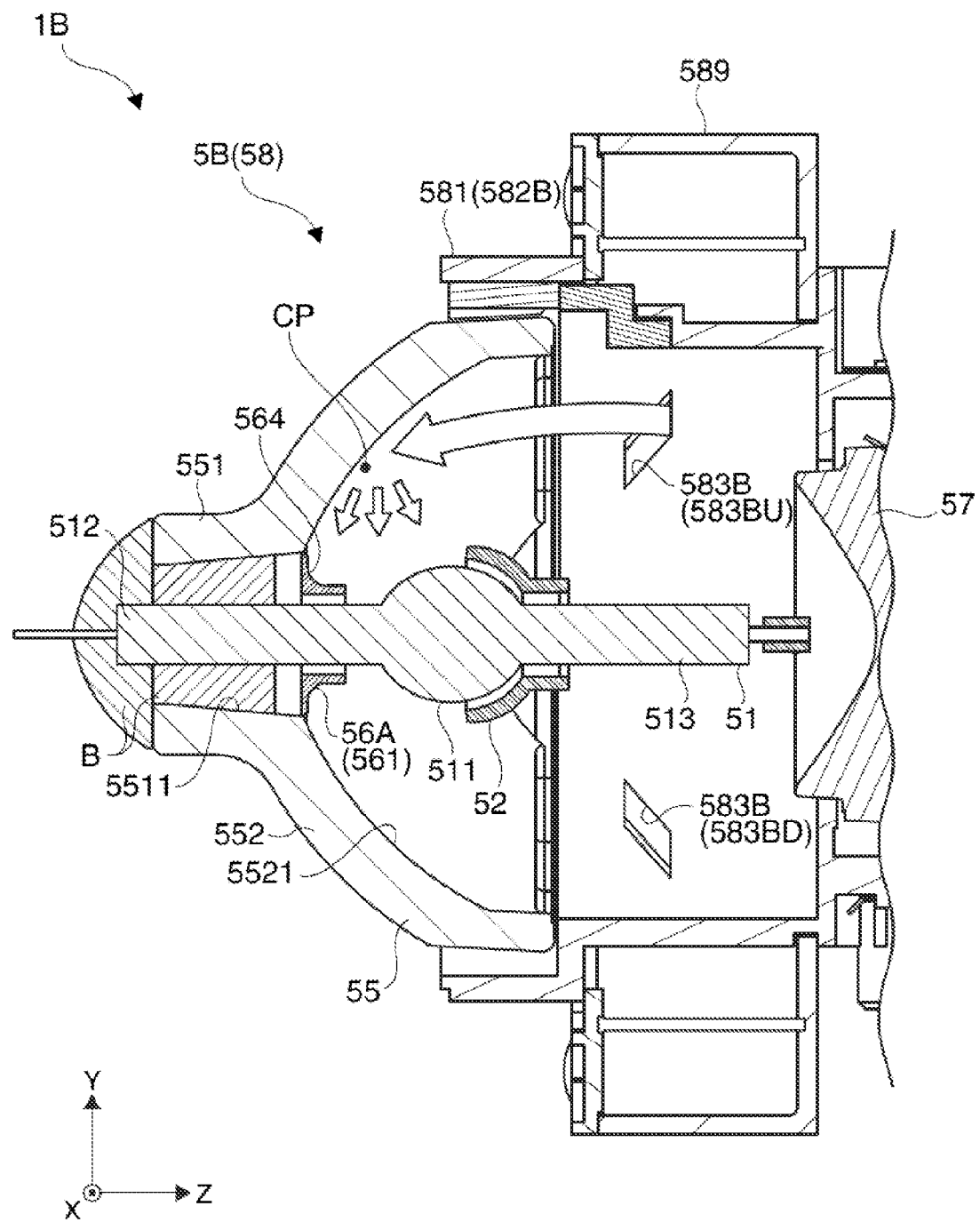
FIG. 8 is a vertical cross-sectional view showing the light source device in the embodiment.

FIGS. 7 and 8 are a lateral cross-sectional view (a cross-sectional view along an X-Y plane) and a vertical cross-sectional view (a cross-sectional view along the Y-Z plane), respectively, showing a light source device 5B. It should be noted that in FIGS. 7 and 8 some of the constituents are omitted from the drawings.

The projector 1B according to the present embodiment has substantially the same configuration as that of the projector 1A except the point that the light source device 5B is provided instead of the light source device 5A. Further, the light source device 5B has substantially the same configuration as that of the light source device 5A except the point that a first main body section 582B is provided instead of the first main body section 582A.

Similarly to the first main body section 582A described above, the first main body section 582B blocks the tip side of the Z direction of the light emitting tube 51, the primary reflecting mirror 55, and so on. As shown in FIGS. 7 and 8, the first main body section 582B has four vents 583B (583BU (FIGS. 7 and 8), 583BD (FIG. 8)).

Among these vents, the two vents 583BU (in FIG. 8, one of the two vents 583BU is omitted from the drawing) are located above the light emitting tube 51 if the projector 1B is installed in the normal setting posture, and the cooling air is guided to each of the vents 583BU via the duct 589. Further, the two vents 583BD (both are not shown in FIG. 7, and one of the two vents 583BD is omitted from the drawing in FIG. 8) are located above the light emitting tube 51 if the projector 1B is in the ceiling mount posture, and the cooling air is similarly guided to each of the vents 583BD.

Here, the two vents 538BU and the two vents 583BD are each formed so as to deliver the cooling air toward a collision position CP set above the light emitting tube 51 in accordance with the installation posture. Specifically, the collision position CP is set at a position above the light emitting tube 51 and shifted from the center of the light emitting section 511 toward the sealing section 512, and in the present embodiment, it is set further on the reflecting surface 5521. Further, the two vents 583BU are formed at positions equally distant from the corresponding collision position CP, and the same can be applied to the two vents 583BD.

Figure 9:
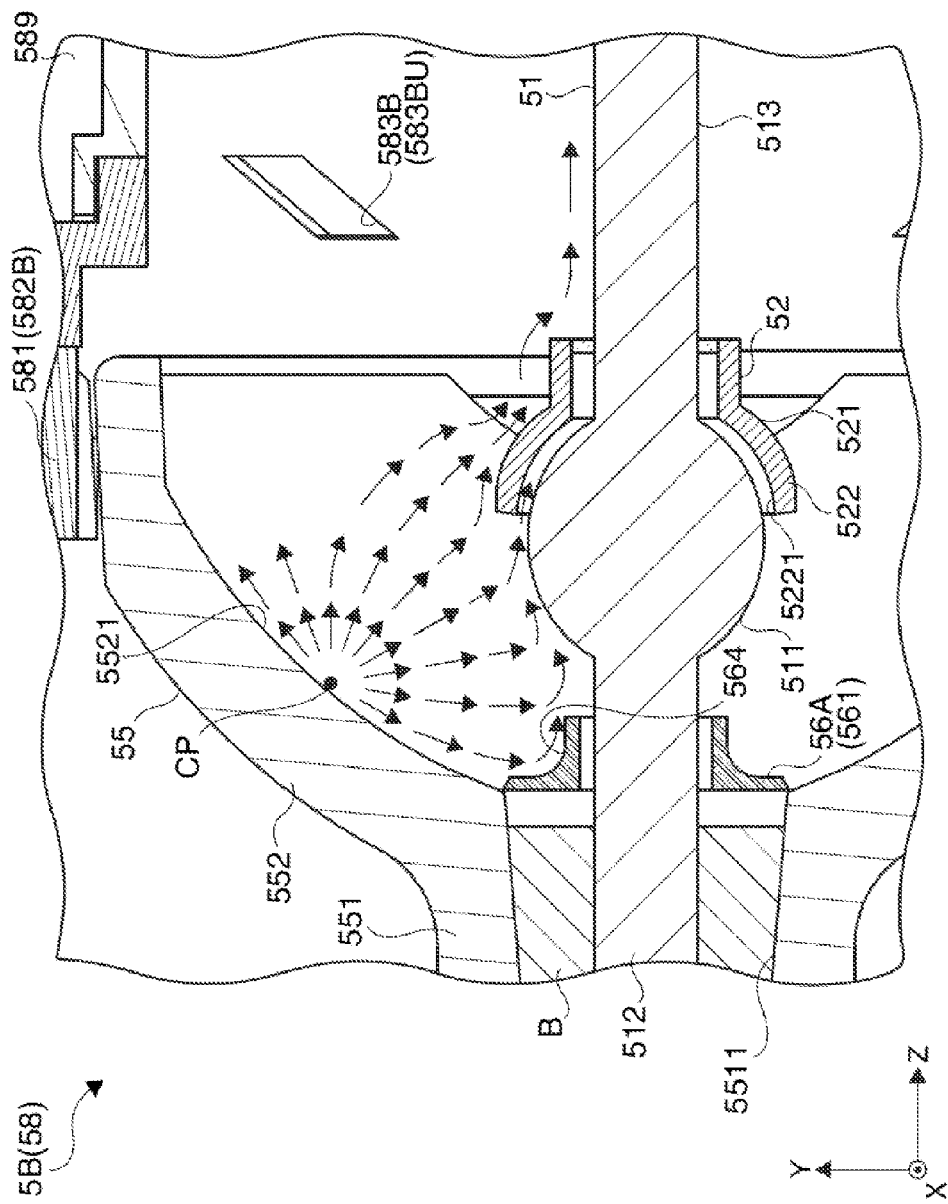
FIG. 9 is a diagram showing a colliding jet generated at a collision position in the embodiment.

FIG. 9 is a diagram showing a colliding jet generated at a collision position CP.

Hereinafter, the flow direction of the colliding jet in the case in which the projector 1B is installed in the normal setting posture will be explained.

As shown in FIGS. 7 and 8, if the projector 1B is installed in the normal setting posture, the cooling air is delivered from each of the two vents 583BU toward the collision position CP, and collides with each other at the collision position CP. Thus, as indicated with the arrows in FIG. 9, there occurs the colliding jet including a turbulent flow and a swirling flow discretely diffused from the collision position CP.

Among the colliding jet thus occurring, a part of the colliding jet flows along the reflecting surface 5521 toward the sealing section 512 (downward), and then reaches the rectifying member 56A.

Here, in the present embodiment, the center of the rectifying surface 564 is located on a straight line proceeding from the center position of the light emitting section 511 toward the collision position CP when viewed from the tip side of the Z direction. Due to the rectifying surface 564 and the pair of standing surfaces 565 (not shown in FIG. 9) described above, the cooling air is folded toward the light emitting section 511, and is guided to the light emitting section 511.

Another part of the colliding jet flows toward the upper part of the light emitting section 511. On this occasion, the upper part of the light emitting section 511 is cooled by the colliding jet directly colliding with the light emitting section 511. Besides the above, the turbulent flow colliding with and then diffused by the light emitting section 511 and the another part of the colliding jet collide with each other, thereby promoting further generation of a turbulent flow. Thus, the heat transfer of the light emitting section 511 is promoted, and thus the light emitting section 511 is further cooled.

Further, the colliding jet flowing toward the light emitting section 511 flows along the light emitting section 511 toward the tip side of the Z direction due to the Coanda effect. The colliding jet thins the thermal boundary layer of the upper part of the light emitting section 511 to thereby promote the heat transfer between the light emitting section 511 and the colliding jet, and thus the upper part of the light emitting section 511 is cooled.

The colliding jet flowing along the light emitting section 511 further flows toward the tip side of the Z direction, and then flows into the gap between the light emitting section 511 and the reflecting surface 5221 of the secondary reflecting mirror 52. Thus, the area in the light emitting section 511 covered by the secondary reflecting mirror 52 is cooled effectively.

On the other hand, still another part of the colliding jet flows toward the secondary reflecting mirror 52, and then flows along the outer surface of the secondary reflecting mirror 52 toward the tip side of the Z direction to thereby cool the sealing section 513.

Another part of the jet other than the parts described above flows further downward from the upper part of the light emitting section 511 to thereby cool the lower part of the light emitting section 511. However, since the part of the jet is a jet at relatively high temperature on which the heat transfer has been performed, and the flow rate of the part of the jet is attenuated until it reaches the lower part of the light emitting section 511, for example, the cooling efficiency of the part of the jet is not high compared to the cooling efficiency of the jet flowing along the upper part of the light emitting section 511.

As described above, in the light emitting section 511, the temperature difference between the upper part having the highest temperature and the lower part with the temperature lower than that of the upper part can be reduced to thereby prevent the deterioration of the light emitting tube 51, and further achieve the improvement in the lighting stability and the longer operating life of the light emitting tube 51.

The air thus cooling the light emitting tube 51 is discharged externally via a discharge port (not shown) provided to the first main body section 582B. Further, the air is sucked by the fan F4 (see FIG. 1), and is discharged to the outside of the exterior housing 2 via the discharge port 2B1 (see FIG. 1).

It should be noted that in the explanation below the flow direction of the cooling air (including the colliding jet) in the case in which the projector 1B is installed in the normal setting posture is described. However, the same can be applied to the flow direction of the cooling air delivered from the two vents 583BD located above the light emitting tube 51 in the case in which the projector 1B is installed in the ceiling mount posture.

According to the projector 1B related to the present embodiment explained hereinabove, in addition to the advantages substantially the same as those of the projector 1A described above, the following advantages can be obtained.

In order for appropriately flowing the colliding jet caused by the collision of the cooling air to the light emitting section 511, it is required to appropriately set the delivery direction of each of the vents 583B for delivering the cooling air and the flow volume of the cooling air. However, such an adjustment is difficult.

In contrast thereto, due to the rectifying member 56A located between the primary reflecting mirror 55 and the light emitting section 511, it is possible to effectively flow the colliding jet thus generated to the light emitting section 511. Therefore, the adjustment of the delivery direction and the flow volume of the cooling air can be simplified.

Third Embodiment

Hereinafter, a third embodiment of the invention will be explained.

Although a projector according to the present embodiment is provided with substantially the same configuration as that of the projector 1B described above, the present projector and the projectors 1A, 1B are different in the point that the rectifying member configured to the present projector is provided with legs extending from the main body section 561.

It should be noted that in the explanation below, the part the same or substantially the same as the part having already been explained is denoted with the same reference symbol, and the explanation therefor will be omitted.

Figure 10:
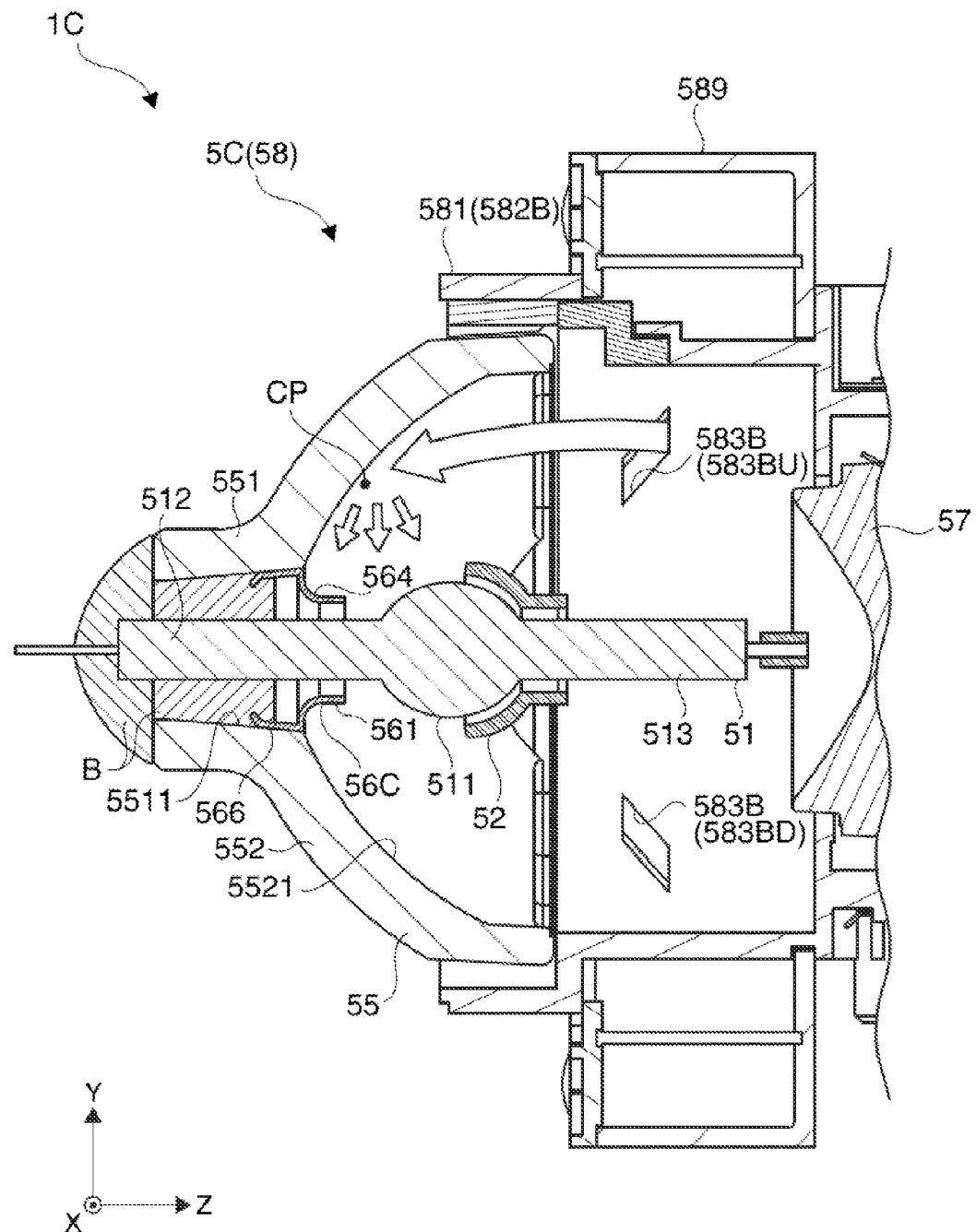
FIG. 10 is a vertical cross-sectional view showing a light source device provided to a projector according to a third embodiment of the invention.

FIG. 10 is a vertical cross-sectional view (the Y-Z cross-sectional view) showing a light source device 5C provided to the projector 1C according to the present embodiment. It should be noted that some of the constituents are omitted from the drawing in FIG. 10.

The projector 1C according to the present embodiment has substantially the same configuration as that of the projector 1B except the point that the light source device 5C is provided instead of the light source device 5B. Further, the light source device 5C has substantially the same configuration as that of the light source device 5B except the point that a rectifying member 56C is provided instead of the rectifying member 56A.

Similarly to the rectifying member 56A, the rectifying member 56C is for adjusting the cooling air and guiding it to the light emitting section 511.

Figure 11:
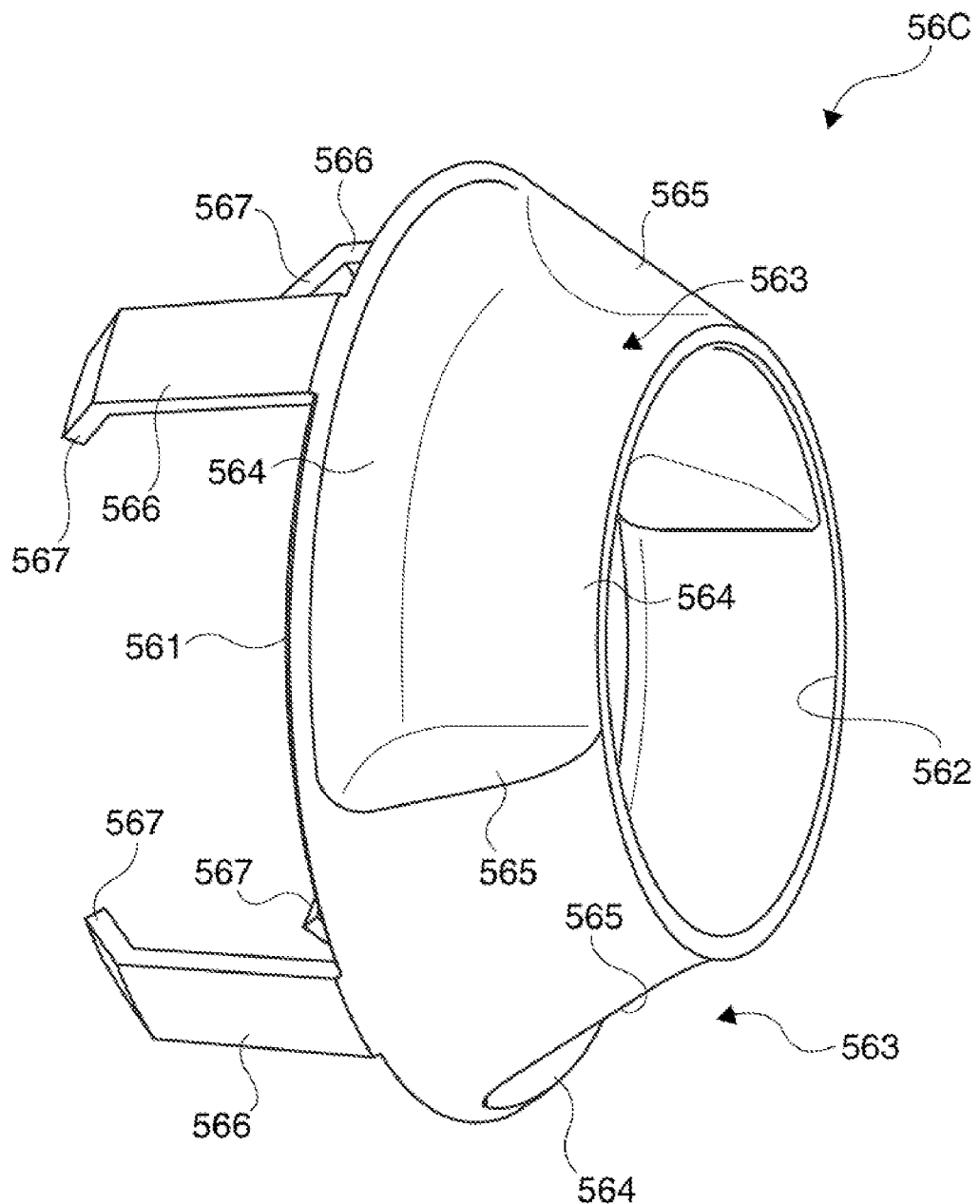
FIG. 11 is a perspective view showing a rectifying member in the embodiment.
Figure 12:
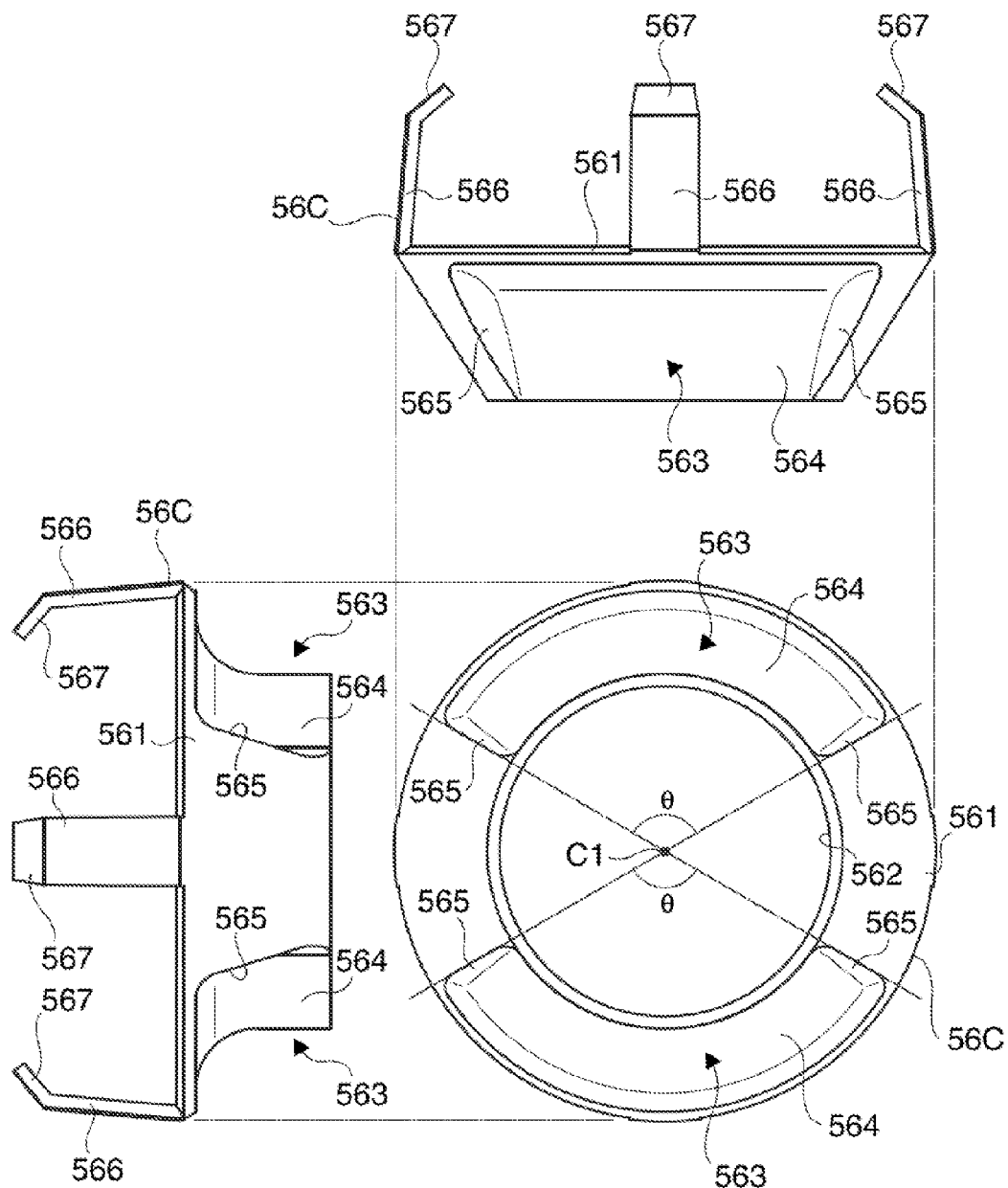
FIG. 12 is a set of orthographic views showing a rectifying member in the embodiment.

FIGS. 11 and 12 are a perspective view and orthographic views, respectively, showing the rectifying member 56C.

As shown in FIGS. 11 and 12, such a rectifying member 56C is provided with the main body section 561 having the opening section 562 and the pair of recesses 563, and four legs 566 extending from the outer edge of the main body section 561.

Among these constituents, the legs 566 each extend from the outer edge of the bottom section (the end portion on the large diameter side) of the main body section 561 having a tubular shape forming a roughly circular truncated cone toward the opposite side to the tip portion (the end portion on the small diameter side) of the main body section 561. The legs 566 are each tilted so as to come closer to the center axis line of the main body portion 561 as the position proceeds toward the tip of the leg 566. Further, the tip portion of each of the leg 566 is further provided with a bend section 567 bending inward. These legs 566 are inserted into the opening section 5511 when the rectifying member 56C is attached to the primary reflecting mirror 55, and are then fixed with an adhesive B.

According to the projector 1C related to the present embodiment explained hereinabove, in addition to the advantages substantially the same as those of the projector 1B described above, the following advantages can be obtained.

Since the rectifying member 56C has the legs 566 to be inserted into the opening section 5511, it is possible to tentatively fix the rectifying member 56C to the opening section 5511 (the primary reflecting mirror 55) without using the adhesive B. Therefore, the rectifying member 56C can easily be attached.

It should be noted that the projector 1C adopts the light source device 5C having substantially the same configuration as that of the light source device 5B except the point that the rectifying member 56C is provided instead of the rectifying member 56A. However, it is possible to obtain the same advantage as described above by adopting a light source device provided with the same configuration as that of the light source device 5A except the point that the rectifying member 56C is provided instead of the rectifying member 56A.

Modifications of Embodiments

The invention is not limited to the embodiments described above, but includes modifications and improvements in a range where the advantages of the invention can be achieved.

Although in each of the embodiments it is assumed that the cooling air for cooling the light emitting tube 51 is delivered via the vent located above the light emitting tube 51 even when the projector 1A through 1C takes either of the normal setting posture and the ceiling mount posture, the invention is not limited thereto. In other words, it is also possible to arrange that the cooling air is delivered via the vent located below the light emitting tube 51. In such a case, if the cooling air is delivered from the two vents located below the light emitting tube 51, the collision position of the cooling air can be set to the collision position CP described above.

Alternatively, it is also possible to form the vents so as to be opposed to the side faces of the light emitting tube 51. In this case, by disposing the rectifying member 56A, 56C so that the recesses 563 are opposed to the vents, it is possible to guide the cooling air blowing against the rectifying member 56A, 56C to the light emitting section 511.

Although in each of the embodiments it is assumed that the primary reflecting mirror 55 as the first reflecting member is provided with the reflecting section 552 extending so as to form a concave curve, the invention is not limited thereto. In other words, the reflecting member having a tabular shape can also be adopted providing the reflecting member is capable of reflecting the incident light from the light emitting section 511. Further, the opening section to which the sealing section 512 constituting the light emitting tube 51 is inserted can be eliminated, and the light emitting tube and the first reflecting member can be separated from each other.

Although in each of the embodiments it is arranged that the angle formed between the pair of standing surfaces 565 is from 60° to 180°, the invention is not limited thereto. In other words, the angle thus formed can be smaller than 60° or can exceed 180° providing the standing surfaces are capable of guiding the cooling air having flown toward the rectifying member to the light emitting section.

Although in each of the embodiments it is assumed that the secondary reflecting mirror 52 as a second reflecting member is attached to the light emitting tube 51, the invention is not limited thereto. In other words, the second reflecting member can be eliminated.

Although in each of the embodiments it is assumed that the main body section 561 constituting the rectifying member 56A, 56C is formed to have a tubular shape forming a roughly circular truncated cone, the invention is not limited thereto. For example, the main body section can have a tubular shape forming a truncated pyramid having a polygonal bottom. Further, the main body section is not required to have a tubular shape, but is only required to have a configuration, which can be disposed between the light emitting section and the first reflecting member.

Although in each of the embodiments the cooling air is adopted as a cooling fluid, the invention is not limited thereto. For example, a liquid such as water and ethylene glycol can also be adopted as the cooling fluid providing the insulation is provided to the whole light source device 5A through 5C.

Although in each of the embodiments it is assumed that the projector 1A through 1C is provided with the three liquid crystal panels 442 (442R, 442G, and 442B), the invention is not limited thereto. Specifically, the invention can also be applied to a projector using two or less liquid crystal panels, or four or more liquid crystal panels.

Although in each of the embodiments the configuration with the optical unit 4 having a substantially L-shape in the plan view is explained, it is not a limitation. A configuration with, for example, a substantially U-shape in the plan view can also be adopted.

Although in each of the embodiments, there are used the transmissive liquid crystal panels 442 each having the light beam entrance surface and the light beam exit surface separated from each other, it is also possible to use the reflective liquid crystal panels each having a common surface used as both of the light beam entrance surface and the light beam exit surface.

Although in each of the embodiments the projector 1A through 1C provided with the liquid crystal panels 442 as the light modulation devices is illustrated as an example, light modulation devices with other configurations can also be adopted providing the light modulation devices form the image light obtained by modulating the incident light beam thereto in accordance with the image information. For example, the invention can also be applied to a projector using a light modulation device other than the liquid crystal device, such as a device using micromirrors. In the case of using such a light modulation device, the polarization plates 443, 445 on the light beam entrance side and the light beam exit side can be eliminated.

Although in each of the embodiments a front projection projector 1A through 1C, in which the projection direction of the image light to the target projection surface and the observation direction of the image with respect to the image light are substantially the same, is illustrated as an example, the invention is not limited thereto. For example, the invention can be applied to a rear projection projector in which the projection direction and the observation direction are opposite to each other.

Further, although in each of the embodiments the light source device 5A through 5C is adopted in the projector 1A through 1C, the invention is not limited thereto. In other words, such a light source device 5A through 5C can also be used for an illumination device such as a lamp.

The invention can be used as a light source device having a light emitting tube, and can preferably be used as a light source device adopted in, for example, a projector.

What is claimed is:

1. A light source device comprising:
   a light emitting tube having a light emitting section configured to emit light;
   a first reflecting member configured to reflect the light emitted from the light emitting section; and
   a rectifying member disposed between the light emitting section and the first reflecting member, and configured to rectify a cooling fluid configured to cool the light emitting tube, the rectifying member including a recess having
   a rectifying surface configured to be a curved surface having a predetermined curvature and guide the cooling fluid flowing toward the rectifying member to the light emitting section, and
   a pair of standing surfaces standing from both ends of the rectifying surface.

2. The light source device according to claim 1, wherein an angle formed between the standing surfaces is from 60° to 180°.

3. The light source device according to claim 1, further comprising:
   a second reflecting member covering the light emitting section and configured to reflect the incident light from the light emitting section,
   wherein the light emitting tube includes a first sealing section and a second sealing section extending from both ends of the light emitting section in respective directions departing from each other,
   the first reflecting member is disposed on a side of the first sealing section, and
   the second reflecting member covers the light emitting section on a side of the second sealing section with a predetermined distance.

4. The light source device according to claim 3, wherein the first reflecting member has an opening section in which the first sealing section is inserted, and
   the rectifying member is formed to have a tubular shape configured to occlude the opening section.

5. The light source device according to claim 4, wherein the rectifying member is attached to the first reflecting member.

6. The light source device according to claim 1, further comprising:
   a housing body configured to house the light emitting tube, the first reflecting member, and the rectifying member inside,
   wherein the housing body has a plurality of vents each configured to flow the cooling fluid, which is introduced externally, inside the housing body, and
   the plurality of vents are formed at respective positions where the vents makes the cooling fluids passing through the vents collide with each other at a collision position above the light emitting section.

7. A projector comprising:
   the light source device according to claim 1;
   a light modulation device configured to modulate the light emitted from the light source device; and
   a projection optical device configured to project the light modulated.

8. The projector according to claim 7, wherein an angle formed between the standing surfaces is from 60° to 180°.

9. The projector according to claim 7, further comprising:
   a second reflecting member covering the light emitting section and configured to reflect the incident light from the light emitting section,
   wherein the light emitting tube includes a first sealing section and a second sealing section extending from both ends of the light emitting section in respective directions departing from each other,
   the first reflecting member is disposed on a side of the first sealing section, and
   the second reflecting member covers the light emitting section on a side of the second sealing section with a predetermined distance.

10. The projector according to claim 9, wherein the first reflecting member has an opening section in which the first sealing section is inserted, and
    the rectifying member is formed to have a tubular shape configured to occlude the opening section.

11. The projector according to claim 10, wherein the rectifying member is attached to the first reflecting member.

12. The projector according to claim 7, further comprising:
    a housing body configured to house the light emitting tube, the first reflecting member, and the rectifying member inside,
    wherein the housing body has a plurality of vents each configured to flow the cooling fluid, which is introduced externally, inside the housing body, and
    the plurality of vents are formed at respective positions where the vents makes the cooling fluids passing through the vents collide with each other at a collision position above the light emitting section.

* * * * *